(12) United States Patent
Xu (10) Patent No.: US 9,686,115 B1
(45) Date of Patent: Jun. 20, 2017

(54) METHOD AND CIRCUIT FOR DETECTING TMCC SIGNAL

(71) Applicant: ALI CORPORATION, Hsinchu (TW)

(72) Inventor: Yu-Ting Xu, Shanghai (CN)

(73) Assignee: ALI CORPORATION, Hsinchu (TW)

( * ) Notice: Subject to any disclaimer, the term of this patent is extended or adjusted under 35 U.S.C. 154(b) by 0 days.

(21) Appl. No.: 15/164,957

(22) Filed: May 26, 2016

(51) Int. Cl.
*H04L 27/06* (2006.01)
*H04L 27/26* (2006.01)

(52) U.S. Cl.
CPC ...... *H04L 27/2675* (2013.01); *H04L 27/2601* (2013.01); *H04L 27/2657* (2013.01)

(58) Field of Classification Search
CPC ............... H04L 27/2662; H04L 5/0048; H04L 27/2649; H04L 27/2675; H04L 27/2601; H04L 27/2657; H04L 5/0023; H04L 5/2647
See application file for complete search history.

(56) References Cited

U.S. PATENT DOCUMENTS

| 8,654,915 | B2* | 2/2014 | Jeong | H04L 27/2656 370/464 |
|---|---|---|---|---|
| 2002/0003773 | A1* | 1/2002 | Okada | H04L 5/06 370/208 |
| 2002/0034214 | A1* | 3/2002 | Okada | H04L 5/023 375/147 |
| 2006/0293006 | A1* | 12/2006 | Taniguchi | H04B 7/0817 455/132 |
| 2008/0192845 | A1* | 8/2008 | Aizawa | H04L 25/03866 375/260 |
| 2010/0310013 | A1* | 12/2010 | Houchi | H04L 5/0048 375/324 |

* cited by examiner

*Primary Examiner* — Khanh C Tran
(74) *Attorney, Agent, or Firm* — Li & Cai Intellectual Property (USA) Office (57) ABSTRACT

Disclosed are a method and a circuit for detecting a TMCC signal. Using this method and circuit, as long as there is a synchronizing signal of the TMCC signal found in the ISDB-T signal received by the receiving device, the TMCC information can be collected from then on. Thereby, the delay time generated each time when the receiving device switches channels can be effectively decreased.

10 Claims, 8 Drawing Sheets

FIG.1

| Bit Number | Purpose/Content |
|---|---|
| B0 | Criteria of differential demodulation |
| B1～B16 | Synchronizing signal (w0=0011010111101110, w1=1100101000010001) |
| B17～B19 | Segment format identification |
| B20～B121 | TMCC information (102 bits) |
| B122～B203 | Parity bit |

METHOD AND CIRCUIT FOR DETECTING TMCC SIGNAL

BACKGROUND OF THE INVENTION

1. Field of the Invention

The instant disclosure relates to a method and a circuit for detecting a transmission and multiplexing configuration control (TMCC) signal; in particular, to a method and a circuit for detecting a TMCC signal used in an Integrated Services Digital Broadcasting-Terrestrial (ISDB-T) system

2. Description of Related Art

The orthogonal frequency division multiplexing (OFDM) technology is a multi-carrier modulation technology of which the working principle is to divide a limited bandwidth into several sub-channels and to transmit data simultaneously by a plurality of sub-carriers that are mutually overlapped. By different modulation mechanisms, each sub-carrier can carry different amounts of data. Thus, compared with the traditional frequency division multiplexing (FDM) technology, the OFDM technology has a higher frequency band utilization rate and can prevent the effects that result from multi-path interferences.

The OFDM technology has been widely used in the current broadcast systems, such as the Integrated Services Digital Broadcasting-Terrestrial (ISDB-T) system. The ISDB-T system and the standard thereof was established by Japan, and has become widely used in the South Africa. According to the standard of the ISDB-T system, the frame is a basic unit to transmit signals, wherein each frame is composed of 204 symbols and each symbol has 13 segments.

In each broadcast system, the parameter information, such as the carrier modulation mode, the interlace mode and the code rate of the convolution code, is all described in the transmission signal. After receiving the signal, a receiving device needs to demodulate the signal to obtain the above parameter information. After that, the receiving device can execute the de-interlace process, the video signal decompressing and the Viterbi decoding. According to the standard of the ISDB-T system, the TMCC signal has been especially defined for recording the above parameter information related to the signal. In addition, one symbol can only transmit one bit of the TMCC signal. Thus, an improved method and a circuit for detecting a TMCC signal is needed so that the receiving device in the ISDB-T system can detect the TMCC signal more quickly.

SUMMARY OF THE INVENTION

The instant disclosure provides a method for detecting a TMCC signal, adapted for a receiving device of an ISDB-T system. The receiving device receives an ISDB-T signal comprising a plurality of symbols, and sequentially extracts a plurality of TMCC pilots from each of the symbols to obtain a reference bit of each symbol. The method for detecting TMCC signals comprises: sequentially comparing the reference bits of the symbols with two synchronizing signals in the TMCC signal, and when the reference bits of the $K^{th}$ to the $(K+15)^{th}$ symbols are equal to one of the synchronizing signals, updating the reference bits of the $K^{th}$ to the $(K+15)^{th}$ symbols as a first word-synchronous serial data, wherein K is a positive integer; collecting the reference bits of the $(K+16)^{th}$ to the $(K+202)^{th}$ symbols and executing a parity check for the reference bits of the $(K+19)^{th}$ to the $(K+120)^{th}$ symbols by the reference bits of the $(K+121)^{th}$ to the $(K+202)^{th}$ symbols to generate a first parity checking result; and determining whether the TMCC signal in the ISDB-T signal is detected according to the first parity checking result.

The instant disclosure further provides a circuit for detecting a TMCC signal, adapted for a receiving device of an ISDB-T system. The receiving device receives an ISDB-T signal comprising a plurality of symbols, and sequentially extracts a plurality of TMCC pilots from each of the symbols to obtain a reference bit of each symbol. The circuit for detecting the TMCC signal comprises a comparison module, a collecting and checking module and a determining module. The comparison module sequentially compares the reference bits of the symbols with two synchronizing signals in the TMCC signal. If the reference bits of the $K^{th}$ to the $(K+15)^{th}$ symbols equal to one of the synchronizing signals, the comparison module updates the reference bits of the $K^{th}$ to the $(K+15)^{th}$ symbols as a first word-synchronous serial data, wherein K is a positive integer. The collecting and checking module collects the reference bits of the $(K+16)^{th}$~the $(K+202)^{th}$ symbols of the ISDB-T signal. In addition, the collecting and checking module executes a parity check for the reference bits of the $(K+19)^{th}$~the $(K+120)^{th}$ symbols by the reference bits of the $(K+121)^{th}$ to the $(K+202)^{th}$ symbols to generate a first parity checking result. The determining module determines whether the TMCC signal in the ISDB-T signal is detected according to the first parity checking result.

To sum up, by implementing the method for detecting the TMCC signals provided by the instant disclosure via the circuit for detecting the TMCC signals also provided by the instant disclosure, as long as there is a synchronizing signal of the TMCC signal found in the ISDB-T signal received by the receiving device, the TMCC information can be collected from then on. Thereby, the delay time generated each time when the receiving device switches channels can be effectively decreased. In addition, the parity check can be executed right after the TMCC information is collected, which provides an excellent double checking mechanism to effectively prevent the wrong determination caused by multi-path interferences.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings. In addition, for an easy instruction, similar reference numbers or symbols refer to elements alike.

The method and the circuit for quickly detecting TMCC signals provided by the instant disclosure can be used in any receiving device in the ISDB-T system. They can be used in any receiving device in the ISDB-T system designed by the skilled in the art depending on needs, and it is not limited herein. According to the standard of the ISDB-T system, there are not only data but also kinds of pilots stored in each frame, such as the scattered pilot (SP) and the TMCC pilot. Where each kind of pilot is configured on the carrier in each frame is regulated according to specific transmission condition, such as the 2K transmission mode, the 4K transmission mode or the 8K transmission mode.

Figure 1:
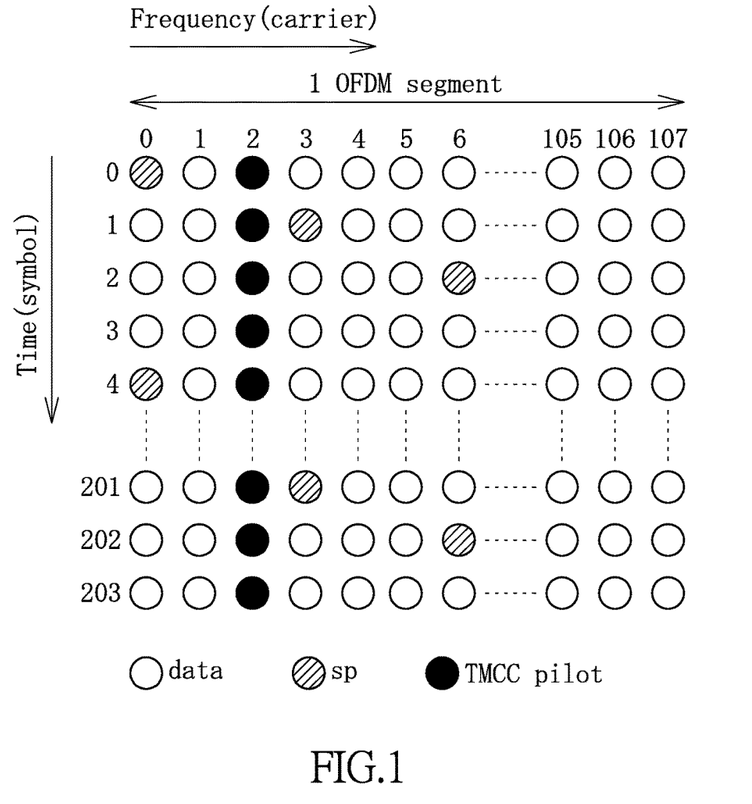
FIG. 1 shows a schematic diagram of a pilot of a frame in the ISDB-T system in one embodiment of the instant disclosure.

Referring to FIG. 1, FIG. 1 shows a schematic diagram of a pilot of a frame in the ISDB-T system in one embodiment of the instant disclosure. The TMCC pilots are respectively configured in each segment of each symbol in each frame. The receiving device identifies one bit of a TMCC signal respectively according to the TMCC pilot in each symbol. In other words, each symbol is only for transmitting one bit of the TMCC signal, and one TMCC signal has totally 204 bits. Thus, as the TMCC signal in the ISDB-T signal has not yet been detected, the receiving device sequentially receives an ISDB-T signal having a plurality of symbols. After that, the receiving device sequentially extracts a plurality of TMCC pilots from each of the symbols to obtain a reference bit of each symbol.

As should be understood by those skilled in the art, before the method for quickly detecting TMCC signals provided by the instant disclosure is executed, the ISDB-T signal has been processed by the modulator, the filter and the digital quadrature demodulator, has been transferred using the Fast Fourier Transform (FFT) and has been equalized. Thus, the ISDB-T signal received by the receiving device is transferred from the time domain to the frequency domain and becomes an OFDM signal.

Figure 2:
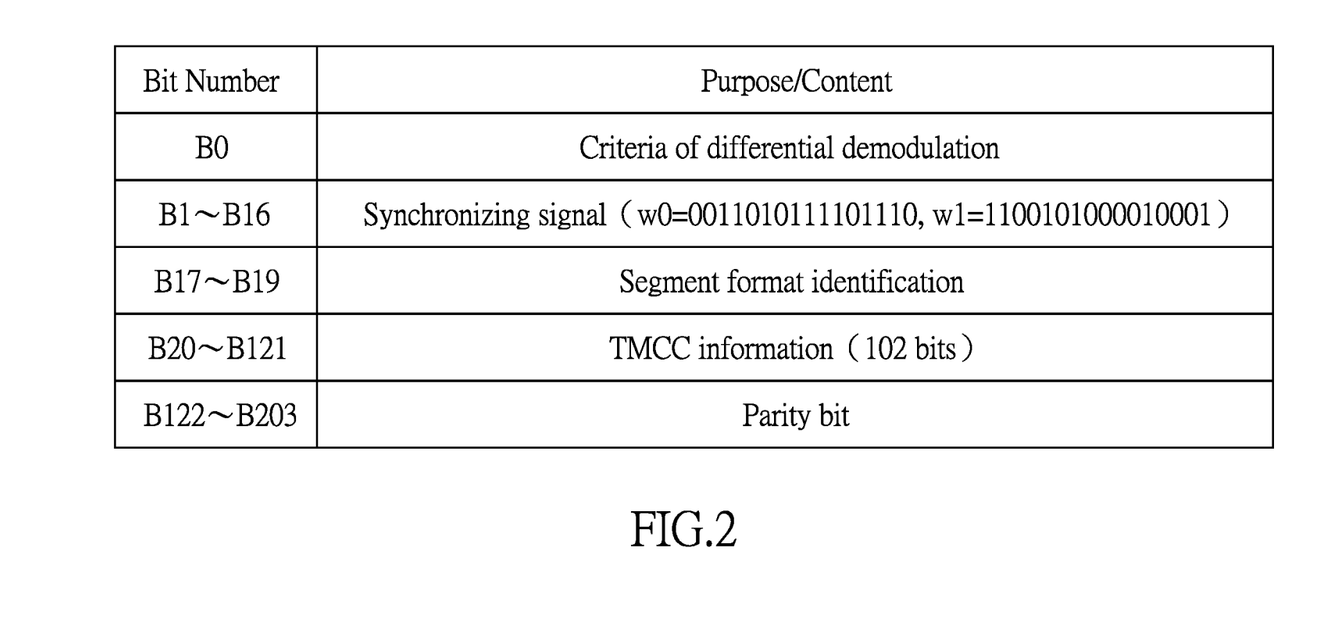
FIG. 2 shows a schematic diagram of the bit distribution of a TMCC signal in one embodiment of the instant disclosure.

Referring to FIG. 2, FIG. 2 shows a schematic diagram of the bit distribution of a TMCC signal in one embodiment of the instant disclosure. In the TMCC signal, the bit B0 is assigned as the criteria of differential demodulation bit, and the bits B1~B16 are assigned as synchronizing signals. These synchronizing signals are divided into two types, such as w0=0011010111101110 and w1=1100101000010001. In addition, the bits B17~B19 are assigned as the segment format identification bits, and the bits B20~B121 are assigned as the TMCC information bits. The TMCC information bits are for describing the parameter information of the TMCC signal. The bits B122~B203 are assigned as the parity bits for identifying the TMCC information.

According to the standard of the ISDB-T system, when the TMCC signal in a first frame of an ISDB-T signal is the synchronizing signal w0, the TMCC signal in a second frame of the ISDB-T signal needs to be the synchronizing signal w1, the TMCC signal in a third frame of the ISDB-T signal needs to be the synchronizing signal w0, and so on. Thus, as should be understood by those skilled in the art, the synchronizing signals w0 and w1 are not only two complementary signals, but can also be used for detecting the TMCC signals in the ISDB-T signal. In other words, they can be used for achieving the frame synchronization for the ISDB-T signal.

Traditionally, it is determined that the TMCC signal has been detected in the ISDB-T signal only when the receiving device finds two entirely opposite synchronizing signals w0 and w1 between two adjacent frames, and the TMCC information is collected after that. However, from the timing when the ISDB-T signal is received to the timing when the TMCC signal in the ISDB-T signal is detected, there is at least a delay of 1.5 frames and only after that can the receiving device finally obtain the parameter information. Thus, whether the TMCC signal in the ISDB-T signal can be quickly detected depends on the length of the delay time generated each time when the receiving device switches channels.

Figure 3A:
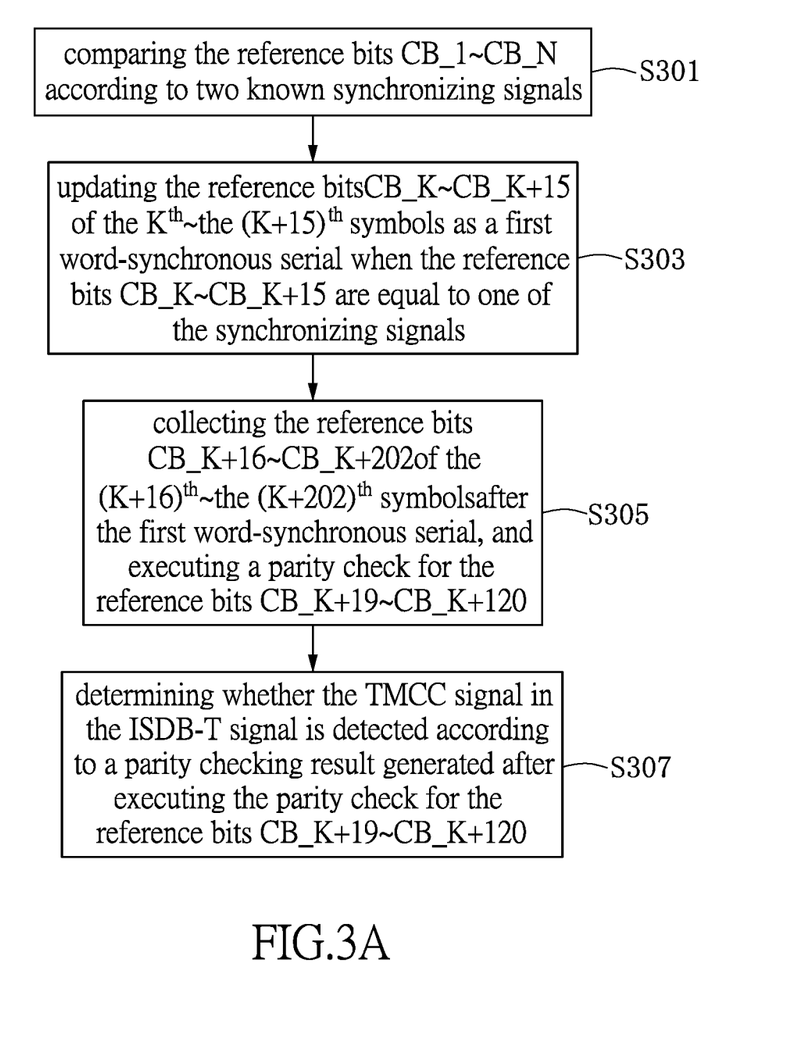
FIG. 3A shows a flow chart of a method for detecting TMCC signals in one embodiment of the instant disclosure.
Figure 3B:
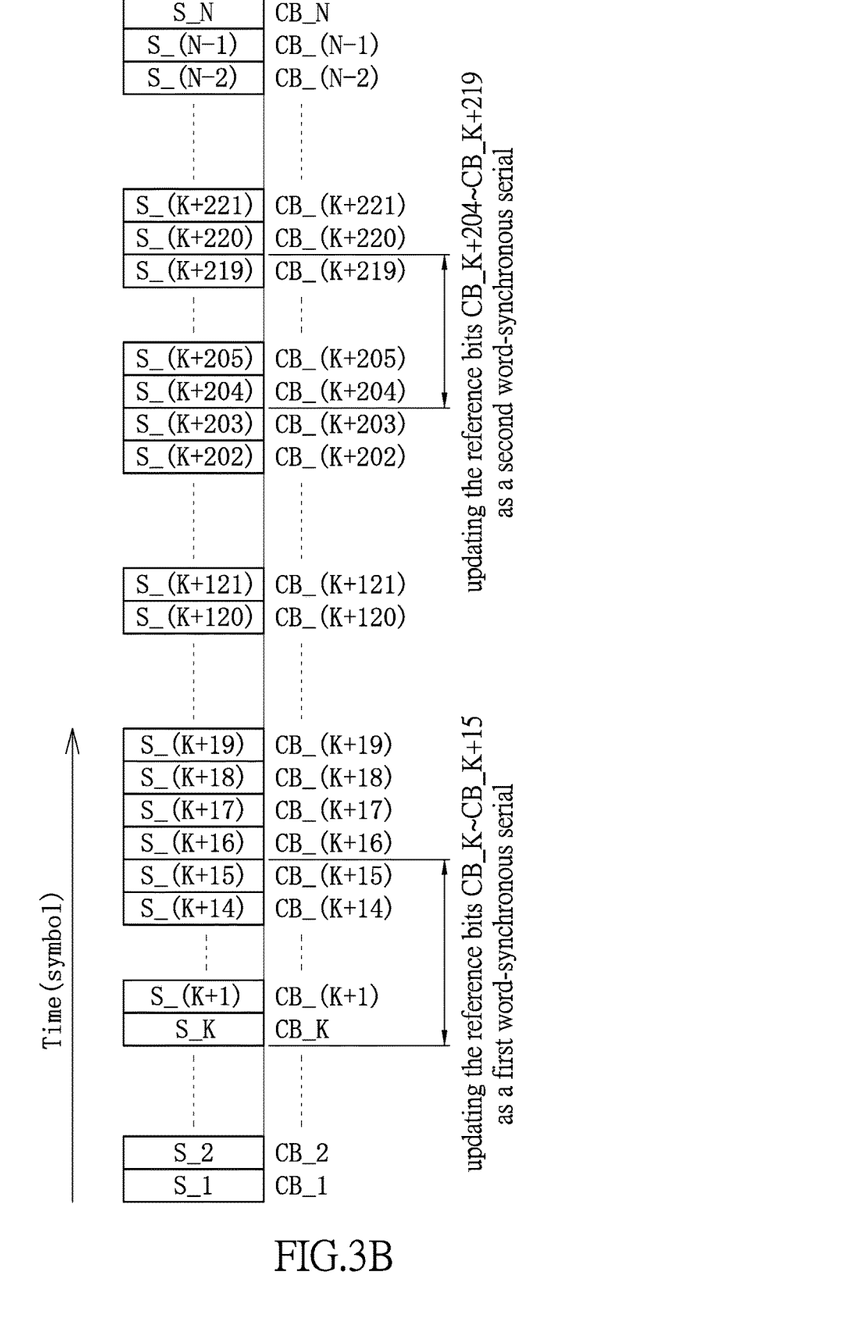
FIG. 3B shows a schematic diagram of executing the method for detecting TMCC signals shown in FIG. 3A.

Referring to FIG. 3A and FIG. 3B, FIG. 3A shows a flow chart of a method for quickly detecting TMCC signals in one embodiment of the instant disclosure, and FIG. 3B shows a schematic diagram of executing the method for quickly detecting TMCC signals shown in FIG. 3A. As mentioned, before it is determined that the TMCC signal in the ISDB-T signal has been detected, the receiving device first receives the ISDB-T signal having a plurality of symbols $S\_1$ to $S\_N$ and sequentially extracts a plurality of TMCC pilots from each symbol $S\_1$ to $S\_N$, to obtain reference bits $CB\_i$ respectively related to each symbol $S\_1$ to $S\_N$, wherein I is a positive integer from 1 to N.

In step S301, the receiving device compares the reference bits $CB\_1$ to $CB\_N$ of the symbols $S\_1$ to $S\_N$ with two known synchronizing signals (that is, w1 and w0) in the TMCC signal. In step S303, when the 16 reference bits $CB\_K$ to $CB\_K+15$ of the $K^{th}$ to the $(K+15)^{th}$ symbols $S\_K$ to $S\_K+15$ are equal to one of the synchronizing signals, the receiving device updates the reference bits $CB\_K$ to $CB\_K+15$ of the $K^{th}$ to the $(K+15)^{th}$ symbols $S\_K$ to $S\_K+15$ as a first word-synchronous serial data SW0, wherein K is a positive integer. For example, when the reference bits $CB\_K$ to $CB\_K+15$ are represented as 0011010111101110, this indicates that the reference bits $CB\_K$ to $CB\_K+15$ are entirely equal to the known synchronizing signal w0. Thus, it can be supposed that one synchronizing signal w0 of the TMCC signal in the ISDB-T signal is found, and the receiving device updates the reference bits $CB\_K$ to $CB\_K+15$ of the $K^{th}$ to the $(K+15)^{th}$ symbols $S\_K$ to $S\_K+15$ as the first word-synchronous serial data SW0.

After the first word-synchronous serial data SW0, in step S305, the receiving device sequentially collects the 187 reference bits $CB\_K+16$ to $CB\_K+202$ of the $(K+16)^{th}$ to the $(K+202)^{th}$ symbols $S\_K+16$ to $S\_K+202$, and executes a parity check for the reference bits $CB\_(K+19)$ to $CB\_(K+120)$ to by the reference bits $CB\_(K+121)$ to $CB\_(K+202)$ to generate a first parity checking result. Finally, in step S307, the receiving device determines whether the TMCC signal in the ISDB-T signal has been successfully detected according to the first parity checking result to.

Briefly, one of achievements of the instant disclosure is that, as long as there is one synchronizing signal (that is, w0 or w1) of the TMCC signal found in the ISDB-T signal received by the receiving device, the receiving device can start to collect the TMCC information and executes the parity check. In this manner, the delay time generated each time when the receiving device switches channels can be effectively decreased. Details related to the parity check are easily understood by those skilled in the art, and thus the information is not repeated here.

Specifically, in step S303, it is supposed that the receiving device has found the synchronizing signal w0 or w1 of the TMCC signal in the ISDB-T signal according to the reference bits CB_K to CB_(K+15) of the $K^{th}$ to the (K+15) symbols S_K to S_K+15, and has updated the reference bits CB_K to CB_(K+15) of the $K^{th}$ to the $(K+15)^{th}$ symbols S_K to S_(K+15) as the first word-synchronous serial data SW0, so the 105 reference bits CB_(K+16) to CB_(K+120) of the $(K+16)^{th}$ to the $(K+120)^{th}$ symbols S_(K+16) to S_(K+120) later sequentially collected by the receiving device can be predetermined as the segment format identification bits and the TMCC information (that is, the bits B17~B121 shown in FIG. 2). Additionally, the 82 reference bits CB_(K+121) to CB_(K+202) of the $(K+121)^{th}$ to the $(K+202)^{th}$ symbols S_(K+121) to S_(K+202) can be predetermined as the parity bits (that is, the bits B122~B203 shown in FIG. 2).

As mentioned, the parity bits are configured for identifying the real TMCC information. If the TMCC information is real, the first parity checking result obtained by executing a parity check for the real TMCC information and its corresponding parity bits must be equal to a predetermined checking result in the ISDB-T system, such as an odd number of "1" s or an even number of "1"s. Thus, in steps S305~S307, the receiving device executes a parity check for the TMCC information that is assumed to be real and its 184 reference bits CB_(K+19) to CB_(K+202), and determines whether the real TMCC signal in the ISDB-T signal has been detected. If the first parity checking result obtained by executing a parity check for the TMCC information (assumed to be the real TMCC signal) and its 184 reference bits CB_(K+19) to CB_(K+202) is equal to the predetermined checking result in the ISDB-T system, the receiving device determines that the real TMCC signal in the ISDB-T signal has been successfully detected. This explains the reason why the delay time generated each time when the receiving device switches channels can be effectively decreased by using the method in this embodiment.

Figure 4:
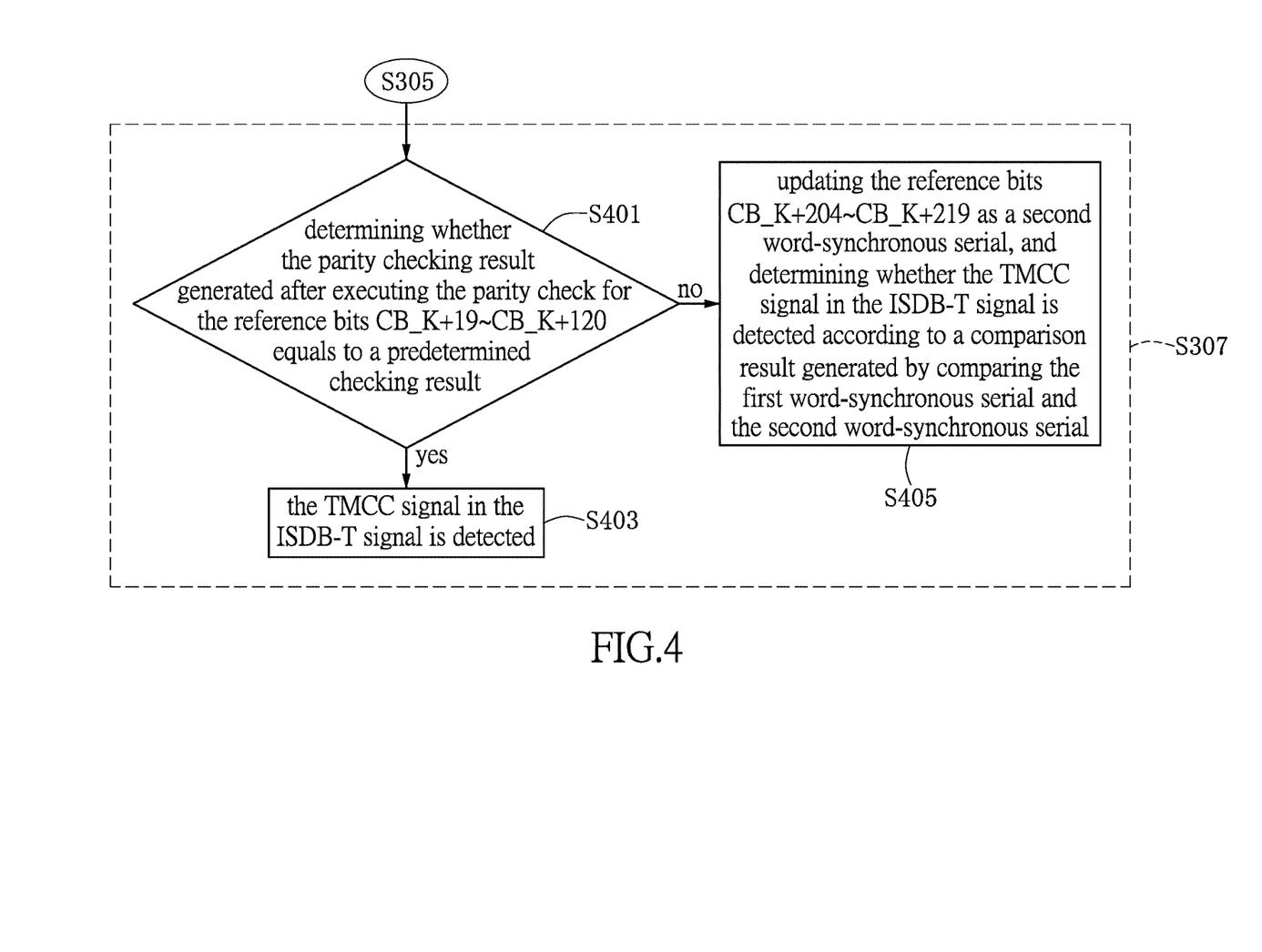
FIG. 4 shows a flow chart of step S307 of the method for detecting TMCC signals shown in FIG. 3A.

However, a distortion of the symbols S_1 to S_N received by the receiving device may result from the multi-path interferences generated during the bit transmission, which will result in an incorrect demodulation of the reference bits CB_1 to CB_N. Thus, in the above situation, when the first parity checking result obtained by executing a parity check for the TMCC information assumed to be real and its 184 reference bits CB_(K+19) to CB_(K+202) is not equal to the predetermined checking result in the ISDB-T system, there is a double checking mechanism provided in this embodiment to effectively prevent the wrong determination caused by multi-path interferences. To further illustrate details of step S307, an embodiment for executing step S307 is provided herein. Referring to FIG. 4, FIG. 4 shows a flow chart of step S307 of the method for detecting TMCC signals shown in FIG. 3A. Similar steps shown in FIG. 3A and FIG. 4 are labeled by similar reference numbers or symbols for an easy instruction.

Referring to FIG. 3A, FIG. 3B and FIG. 4, Step S307 further comprises steps S401~S405. In step S401, the receiving device determines whether the first parity checking result obtained by executing a parity check for the reference bits CB_(K+19) to CB_(K+202) of the TMCC information assumed to be real is equal to the predetermined checking result in the ISDB-T system. If yes, in step S403, the receiving device determines that the real TMCC signal in the ISDB-T signal has been successfully detected. If no, in step S405, the receiving device updates the 16 reference bits CB_(K+204) to CB_(K+219) of the $(K+204)^{th}$ to the $(K+219)^{th}$ symbols S_(K+204) to S_(K+219) of the ISDB-T signal as a second word-synchronous serial data SW1 of the ISDB-T signal, and determines whether the TMCC signal in the ISDB-T signal has been successfully detected according to a comparison result generated by comparing the first word-synchronous serial data SW0 and the second word-synchronous serial data SW1.

For each frame of the ISDB-T signal, only the synchronizing signals of the TMCC signal are complementary (that is, w0 and w1), the criteria of differential demodulation bit, the segment format identification bits, the TMCC information and the parity bits of the TMCC signal in each frame are all fixed. For example, when the bits B17~B203 of the TMCC signal in the first frame of the ISDB-T signal are 111101101101 . . . 1011, the bits B17~B203 of the TMCC signal in every frame of the ISDB-T signal must be 111101101101 . . . 1011. In this manner, when the TMCC signal in the ISDB-T signal has been successfully detected (that is, the frame synchronization has completed), it can be determined that all parameter information received by the receiving device are the same, such that the receiving device can decode each frame of the ISDB-T signal by the parameter information.

If the reference bits CB_K to CB_K+15 of the $K^{th}$ to the $(K+15)^{th}$ symbols S_K to S_K+15 which the receiving device updates as the first word-synchronous serial data SW0 are not equal to the synchronizing signal w0 or w1 of the TMCC signal, the reference bits CB_K to CB_(K+15) appear again after 204 symbols. Thus, when the first parity checking result obtained by executing a parity check for the TMCC information (assumed to be the real TMCC signal) and its 184 reference bits CB_(K+19) to CB_(K+202) is not equal to the predetermined checking result in the ISDB-T system, the receiving device updates the reference bits CB_(K+204) to CB_(K+219), which are 204 symbols after the reference bits CB_K to CB_(K+15), as a second word-synchronous serial data SW1, and determines whether the reference bits CB_(K+204) to CB_(K+219) in the second word-synchronous serial data SW1 are all equal to the reference bits CB_K to CB_(K+15) in the first word-synchronous serial data SW0, so as to determine whether the TMCC signal in the ISDB-T signal has been successfully detected.

Figure 5:
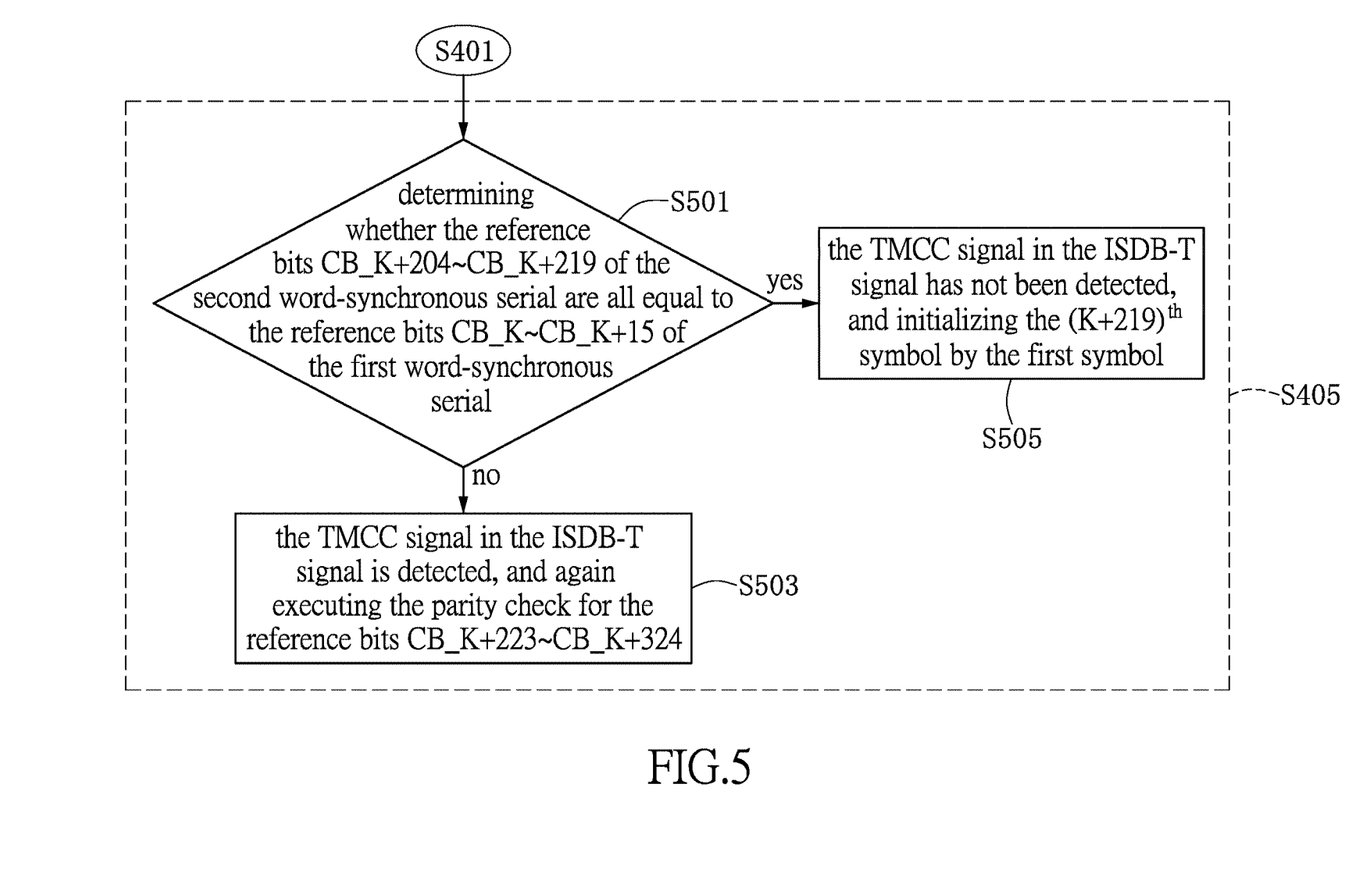
FIG. 5 shows a flow chart of step S405 of the method for detecting TMCC signals shown in FIG. 4.

To further illustrate details of step S405, an embodiment for executing step S405 is provided herein. Refer to FIG. 5. FIG. 5 shows a flow chart of step S405 of the method for detecting TMCC signals shown in FIG. 4. Similar steps shown in FIG. 5, FIG. 4 and FIG. 3A are labeled by similar reference numbers or symbols.

Referring to FIG. 3A, FIG. 3B, FIG. 4 and FIG. 5, Step S405 further comprises steps S501~S505. In step S501, the receiving device determines whether the reference bits CB_(K+204) to CB_(K+219) in the second word-synchronous serial data SW1 are all equal to the reference bits CB_K to CB_(K+15) in the first word-synchronous serial data SW0. If no, it indicates that the first word-synchronous serial data SW0 previously obtained is actually the synchronizing signal w0 or w1 of the TMCC signal. In this case, in step S503, the receiving device determines that the TMCC signal in the ISDB-T signal has been successfully detected. In addition, the receiving device again executes another parity check for the 102 reference bits CB_(K+223) to CB_(K+324) of the $(K+223)^{th}$ to the $(K+324)^{th}$ symbol S_(K+223) to S_(K+

324) by the 82 reference bits CB_(K+325) to CB_(K+406) of the (K+325)$^{th}$~the (K+406)$^{th}$ symbol S_(K+325) to S_(K+406) to generate a second parity checking result, and then determines whether the TMCC signal in the ISDB-T signal is detected according to the second parity checking result.

If yes, it indicates that the first word-synchronous serial data SW0 previously obtained is not a synchronizing signal but only part of bits of the TMCC signal which are coincidentally equal to the synchronizing signal w0 or w1 of the TMCC signal. In this case, in step S505, the receiving device determines that the TMCC signal in the ISDB-T signal has not yet been detected. In addition, the receiving device initializes the (K+219)$^{th}$ symbol S_(K+219) of the ISDB-T signal by the first symbol S_1 of the ISDB-T signal. As a result, it returns to step S301 to restart the method for continually detecting TMCC signal.

Specifically speaking, in step S503, the reference bits CB_(K+204) to CB_(K+219) in the second word-synchronous serial data SW1 are not all equal to the reference bits CB_K to CB_(K+15) in the first word-synchronous serial data SW0, so the receiving device can determine that the first word-synchronous serial data SW0 and the second word-synchronous serial data SW1 are two complementary synchronizing signals w0 and w1, and that the TMCC signal in the ISDB-T signal has been successfully detected. to However, as described, whether the TMCC signal in the ISDB-T signal has been successfully detected is determined by whether the parity check has been done. Assumed that the receiving device has detected the complementary synchronizing signals w0 or w1 according to the reference bits CB_(K+204) to CB_(K+219) that is just determined as the second word-synchronous serial data SW1. In this case, the reference bits CB_(K+223) to CB_(K+406) that are collected by the receiving device are supposed to be parity bits. Thus, in the step S503, the receiving device executes a parity check for these 184 reference bits CB_(K+223) to CB_(K+406) to determine whether the TMCC signal in the ISDB signal is successfully detected.

Likewise, when the parity check for these 184 reference bits CB_(K+223) to CB_(K+324) has been done, the receiving device determines that the TMCC signal in the ISDB signal is successfully detected. On the contrary, if the parity check for these 184 reference bits CB_(K+223) to CB_(K+324) fails, the receiving device determines that the TMCC signal in the ISDB signal has not been detected. It is easily understood by the skilled in the art that, if the above parity check for these 184 reference bits CB_(K+223) to CB_(K+324) fails, the receiving device will still initialize the (K+219)$^{th}$ symbol S_(K+219) of the ISDB-T signal by the first symbol S_1 of the ISDB-T signal, and restarts the method from step S301 for continually detecting TMCC signal.

In addition, in step S505, the reference bits CB_(K+204) to CB_(K+219) in the second word-synchronous serial data SW1 are all equal to the reference bits CB_K to CB_(K+15) in the first word-synchronous serial data SW0, so the receiving device can determine that the first word-synchronous serial data SW0 and the second word-synchronous serial data SW1, following each other after 204 symbols, are the same word-synchronous serial data, and that the TMCC signal in the ISDB-T signal has not yet been found. Thus, the receiving device again starts to find the reference bits of the symbols S_(K+219) to S_N that are equal to one of the synchronizing signals w0 and w1. In other words, the receiving device initializes the (K+219)$^{th}$ symbol S_(K+219) of the ISDB-T signal by the first symbol S_1 ISDB-T signal. As a result, it returns to step S301 to restart the method for continually detecting the TMCC signal. Accordingly, it can be determined that the receiving device can always detect the TMCC signal in the ISDB-T signal after executing this method just a few times, which makes the frame synchronization of the ISDB-T signal be completed more effectively than the traditional method.

It should be noted that, the step S405 describe in the above embodiment is for illustrating but not restricting the instant disclosure. In other embodiments, whether the TMCC signal in the ISDB-T signal has been detected can also be decided by determining whether the reference bits to in the second word-synchronous serial data SW1 are entirely opposite to the reference bits to in the first word-synchronous serial data SW0. In this manner, when the reference bits to in the second word-synchronous serial data SW1 are entirely opposite to the reference bits to in the first word-synchronous serial data SW0, the receiving device can determine that the TMCC signal in the ISDB-T signal has been successfully detected. In addition, the receiving device executes another parity check for the reference bits CB_(K+223) to CB_(K+234) to generate a second parity checking result, and then determines whether the TMCC signal in the ISDB-T signal has been detected according to the second parity checking result. Briefly, the implementation of step S405 is not restricted herein.

Figure 6:
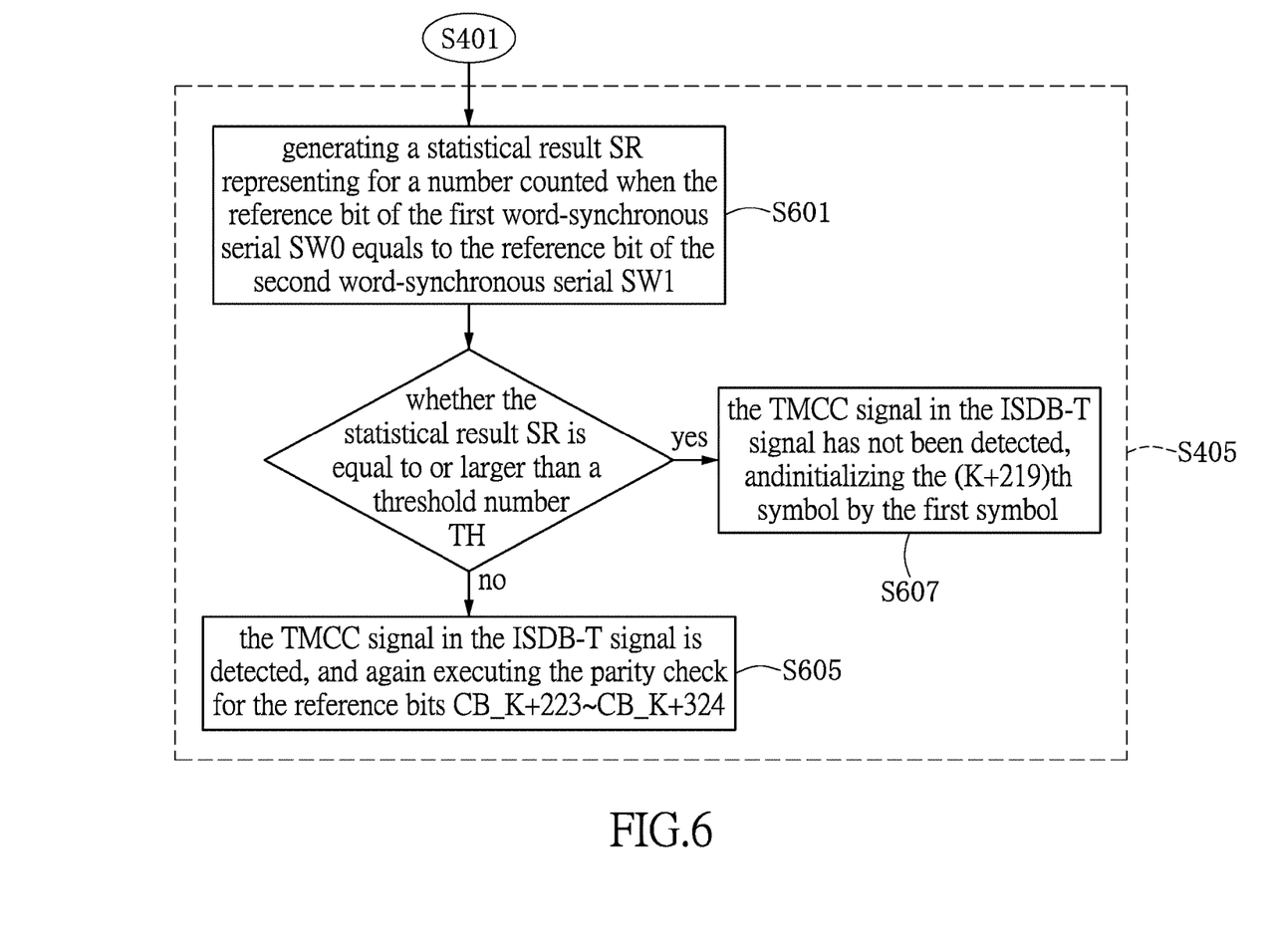
FIG. 6 shows another flow chart of step S405 of the method for detecting TMCC signals shown in FIG. 4.

However, the reference bits to in the first word-synchronous serial data SW0 and the reference bits to in the second word-synchronous serial data SW1 may be incorrectly demodulated because of multi-path interference generated during the bit transmission, and thus another embodiment of step S405 is provided as follows. Referring to FIG. 6, FIG. 6 shows another flow chart of step S405 of the method for detecting TMCC signals shown in FIG. 4. Similar steps shown in FIG. 6, FIG. 4 and FIG. 3A are labeled by similar reference numbers or symbols.

Referring to FIG. 3A, FIG. 3B, FIG. 4 and FIG. 6, Step S405 further comprises steps S601~S607. In step S601, the receiving device compares the reference bits CB_K to CB_(K+15) of the first word-synchronous serial data SW0 and the reference bits CB_(K+204) to CB_(K+219) of the second word-synchronous serial data SW1 one by one, and generates a statistical result SR representing a number counted when there is a reference bit of the first word-synchronous serial SW0 equal to a reference bit of the second word-synchronous serial SW1. In step S603, the receiving device determines whether the statistical result SR is equal to or larger than a threshold number TH.

After that, in step S605, when the statistical result SR is smaller than the threshold number TH, the receiving device determines that the TMCC signal in the ISDB-T signal has been successfully detected. In addition, the receiving device executes another parity check for the reference bits CB_(K+223) to CB_(K+324) of the (K+223)$^{th}$ to the (K+324)$^{th}$ symbols S_(K+223) to S_(K+324) by the 82 reference bits CB_(K+325) to CB_(K+406) of the (K+325)$^{th}$~the (K+406)$^{th}$ symbols S_(K+325) to S_(K+406) to generate a second parity checking result, and determines whether the TMCC signal in the ISDB-T signal has been detected according to the second parity checking result. However, when the statistical result SR is equal to or larger than the threshold number TH, in step S607, the receiving device determines that the TMCC signal in the ISDB-T signal has not been detected. In addition, the receiving device initializes the (K+219)$^{th}$ symbol S_K+219 of the ISDB-T signal by the first symbol S_1 of the ISDB-T signal. As a result, it returns to step S301 to restart the method for continually detecting the TMCC signal.

As shown by FIG. 3B, the reference bits to which the receiving device updates as the first word-synchronous serial data SW0 may be equal to the synchronizing signal w0 of the TMCC signal, "0011010111101110", while the first word-synchronous serial data SW0 is actually not the real synchronizing signal w0. Moreover, the reference bits of the second word-synchronous serial data SW1 are supposed to be entirely equal to the reference bits of the second word-synchronous serial data SW0, but the reference bits of the second word-synchronous serial data SW1 may be wrongly demodulated as 0011110111101111. In this case, the receiving device will incorrectly determine that one of the synchronizing signals of the TMCC signal in the ISDB-T signal has been found (that is, step S503). to On the contrary, in the embodiment shown in FIG. 6, the receiving device can correctly determine that one of the synchronizing signals of the TMCC signal in the ISDB-T signal has not yet been found because the statistical result SR generated by counting when the reference bit of the first word-synchronous serial data SW0, which is 0011010111101110, equals to the reference bit of the second word-synchronous serial data SW1, which is 0011110111101111, is "14", and the statistical result SR "14" is larger than a threshold number TH, for example, "10". Moreover, the receiving device initializes the $(K+219)^{th}$ symbol S_K+219 of the ISDB-T signal by the first symbol S_1 of the ISDB-T signal (that is, step S607). As a result, it returns to step S301 to restart the method for continually detecting the TMCC signal. Compared with the embodiment shown in FIG. 5, the embodiment shown in FIG. 6 can effectively prevent the receiving device from determining the situation that "the first word-synchronous serial data SW0 are not entirely equal to the second word-synchronous serial data SW1" as the situation that "the first word-synchronous serial data SW0 and the second word-synchronous serial data SW1 are entirely complementary" because of the multi-path interferences generated during the bit transmission.

Figure 7:
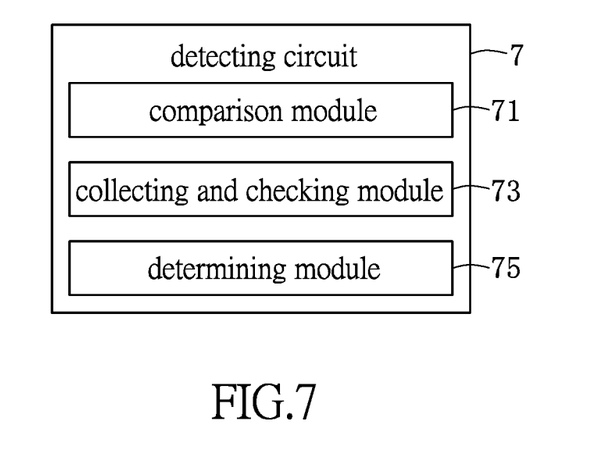
FIG. 7 shows a block diagram of a circuit for detecting TMCC signals in one embodiment of the instant disclosure.

In order to further illustrate the method for detecting a TMCC signal provided in the above embodiments, one embodiment of a circuit for detecting TMCC signals is provided herein. Refer to FIG. 7. FIG. 7 shows a block diagram of a circuit for detecting TMCC signals in one embodiment of the instant disclosure. The circuit provided in this embodiment is for illustrating but not for restricting the circuit for executing the method for detecting TMCC signal provided in the above embodiments.

The detecting circuit 7 is used in a receiving device in the ISDB-T system. The receiving device receives an ISDB-T signal comprising a plurality of symbols, and sequentially extracts a plurality of TMCC pilots from each of the symbols to obtain a reference bit of each symbol. The detecting circuit 7 comprises a comparison module 71, a collecting and checking module 73 and a determining module 75. These modules can be all implemented by hardware circuits, or by hardware circuits and firmware circuits or software, and it is not limited herein. Moreover, the comparison module 71, the collecting and checking module 73 and the determining module 75 can be configured integrally or separately, and it is also not limited herein.

As mentioned, before the method for quickly detecting TMCC signals provided by the instant disclosure is executed, the ISDB-T signal has been processed by the modulator, the filter and the digital quadrature demodulator, and has been transferred using the Fast Fourier Transform (FFT) and has been equalized. Thus, the ISDB-T signal received by the receiving device is transferred from the time domain to the frequency domain and becomes an OFDM signal. The detecting circuit 7 in this embodiment can execute the method for detecting a TMCC signal shown in FIG. 3A, so FIG. 3A and FIG. 3B can be referred to and the information is not repeated.

The comparison module 71 sequentially compares the reference bits of the symbols with two synchronizing signals in the TMCC signal. When the 16 reference bits of the $K^{th}$ to the $(K+15)^{th}$ symbols equal to one of the synchronizing signals, the comparison module 71 updates these reference bits of the $K^{th}$ to the $(K+15)^{th}$ symbols as a first word-synchronous serial data, wherein K is a positive integer. The collecting and checking module 73 collects the 187 reference bits of the $(K+16)^{th}$~the $(K+202)^{th}$ symbols of the ISDB-T signal and executes a parity check for the 102 reference bits of the $(K+19)^{th}$~the $(K+120)^{th}$ symbols by the 82 reference bits of the $(K+121)^{th}$~the $(K+202)^{th}$ symbols to generate a first parity checking result. The determining module 75 determines whether the TMCC signal in the ISDB-T signal is successfully detected according to the first parity checking result.

Additionally, referring to FIG. 4, the determining module 75 can execute the method shown in FIG. 4.

If the first parity checking result generated after executing the parity check for the reference bits of the $(K+19)^{th}$ to the $(K+120)^{th}$ symbols does not equal to a predetermined checking result of the ISDB-T system, the determining module 75 updates the 16 reference bits of the $(K+204)^{th}$ to the $(K+219)^{th}$ symbols, which are 204 symbols after the reference bits CB_K to CB_(K+15) of the ISDB-T signal as a second word-synchronous serial data of the ISDB-T signal. After that, the determining module 75 determines whether the TMCC signal in the ISDB-T signal has been successfully detected by determining whether the reference bits of the second word-synchronous serial data are all equal to the reference bits of the first word-synchronous serial data.

In this manner, the incorrect demodulation due to the multi-path interferences generated during the bit transmission can be effectively avoided. The determining module 75 also can execute step S405 shown in FIG. 5 and step S405 shown in FIG. 6.

To sum up, by implementing the method for detecting the TMCC signals provided by the instant disclosure via the circuit for detecting the TMCC signals also provided by the instant disclosure, as long as there is a synchronizing signal of the TMCC signal found in the ISDB-T signal received by the receiving device, the TMCC information can be collected from then on. Thereby, the delay time generated each time when the receiving device switches channels can be effectively decreased. In addition, the parity check can be executed right after the TMCC information is collected, which provides an excellent double checking mechanism to effectively prevent the wrong determination caused by multi-path interferences.

What is claimed is:

1. A method for detecting a Transmission and Multiplexing Configuration Control (TMCC) signal, adapted for a receiving device of an Integrated Services Digital Broadcasting-Terrestrial (ISDB-T) system, the receiving device receiving an ISDB-T signal comprising a plurality of symbols, and sequentially extracting a plurality of TMCC pilots from each of the symbols to obtain a reference bit of each symbol, the method comprising:

sequentially comparing the reference bits of the symbols with two synchronizing signals in the TMCC signal, and when the reference bits of the $K^{th}$ to the $(K+15)^{th}$ symbols are equal to one of the synchronizing signals, updating the reference bits of the $K^{th}$ to the $(K+15)^{th}$ symbols as a first word-synchronous serial data, wherein K is a positive integer;

collecting the reference bits of the $(K+16)^{th}$ to the $(K+202)^{th}$ symbols and executing a parity check for the reference bits of the $(K+19)^{th}$ to the $(K+120)^{th}$ symbols by the reference bits of the $(K+121)^{th}$ to the $(K+202)^{th}$ symbols to generate a first parity checking result; and determining whether the TMCC signal in the ISDB-T signal is detected according to the first parity checking result.

2. The method according to claim 1, wherein in the step of determining whether the TMCC signal in the ISDB-T signal is detected according to the first parity checking result further comprising steps:

determining whether the parity check for the reference bits of the $(K+19)^{th}$ to the $(K+120)^{th}$ symbols has been done;

determining that the TMCC signal in the ISDB-T signal is detected when the parity check has been done; and updating the reference bits of the $(K+204)^{th}$ to the $(K+219)^{th}$ symbols of the ISDB-T signal as a second word-synchronous serial data of the ISDB-T signal when the parity check has not yet been done, determining whether one of the synchronizing signals of the ISDB-T signal is detected according to a comparison result generated by comparing the first word-synchronous serial data and the second word-synchronous serial data, and then determining whether the TMCC signal in the ISDB-T signal is detected according to the first parity checking result.

3. The method according to claim 2, wherein in the step of determining whether one of the synchronizing signals of the ISDB-T signal is detected according to the comparison result generated by comparing the first word-synchronous serial data and the second word-synchronous serial data, and then determining whether the TMCC signal in the ISDB-T signal is detected according to the first parity checking result, comprising steps:

determining whether the reference bits of the second word-synchronous serial data are all equal to the reference bits of the first word-synchronous serial data;

determining one of the synchronizing signals of the ISDB-T signal is detected when the reference bits of the second word-synchronous serial data are not all equal to the reference bits of the first word-synchronous serial data, executing the parity check for the reference bits of the $(K+223)^{th}$ to the $(K+324)^{th}$ symbol by the reference bits of the $(K+325)^{th}$ to the $(K+406)^{th}$ symbol to generate a second parity checking result, and then determining whether the TMCC signal in the ISDB-T signal is detected according to the second parity checking result; and determining one of the synchronizing signals of the ISDB-T signal has not yet been detected when the reference bits of the second word-synchronous serial data are all equal to the reference bits of the first word-synchronous serial data, initializing the $(K+219)^{th}$ symbol by the first symbol, and then returning to the step of sequentially comparing the reference bits of the symbols with the two synchronizing signals in the TMCC signal.

4. The method according to claim 2, wherein in the step of determining whether one of the synchronizing signals of the ISDB-T signal is detected according to the comparison result generated by comparing the first word-synchronous serial data and the second word-synchronous serial data, and then determining whether the TMCC signal in the ISDB-T signal is detected according to the first parity checking result, comprising steps:

comparing each reference bit of the first word-synchronous serial data and each reference bit of the second word-synchronous serial data one by one to generate a statistical result representing a number counted when the reference bit of the first word-synchronous serial data is equal to the reference bit of the second word-synchronous serial data;

determining whether the statistical result is equal to or larger than a threshold number;

determining one of the synchronizing signals of the ISDB-T signal is detected when the statistical result is less than the threshold number, executing the parity check for the reference bits of the $(K+223)^{th}$ to the $(K+324)^{th}$ symbols by the reference bits of the $(K+325)^{th}$ to the $(K+406)^{th}$ symbols to generate a second parity checking result, and then determining whether the TMCC signal in the ISDB-T signal is detected according to the second parity checking result; and determining one of the synchronizing signals of the ISDB-T signal has not yet been detected when the statistical result is equal to or larger than the threshold number, initializing the $(K+219)^{th}$ symbol by the first symbol, and then returning to the step of sequentially comparing the reference bits of the symbols with the two synchronizing signals in the TMCC signal according to claim 1.

5. The method according to claim 1, wherein the synchronizing signals are complementary signals.

6. A circuit for detecting a Transmission and Multiplexing Configuration Control (TMCC) signal, adapted for a receiving device of an Integrated Services Digital Broadcasting-Terrestrial (ISDB-T) system, the receiving device receiving an ISDB-T signal comprising a plurality of symbols, and sequentially extracting a plurality of TMCC pilots from each of the symbols to obtain a reference bit of each symbol, the circuit comprising:

a comparison module, sequentially comparing the reference bits of the symbols with two synchronizing signals in the TMCC signal, and when the reference bits of the $K^{th}$ to the $(K+15)^{th}$ symbols are equal to one of the synchronizing signals, updating the reference bits of the $K^{th}$ to the $(K+15)^{th}$ symbols as a first word-synchronous serial data, wherein K is a positive integer;

a collecting and checking module, collecting the reference bits of the $(K+16)^{th}$ to the $(K+202)^{th}$ symbols of the ISDB-T signal and executing a parity check for the reference bits of the $(K+19)^{th}$ to the $(K+120)^{th}$ symbols by the reference bits of the $(K+121)^{th}$ to the $(K+202)^{th}$ symbols to generate a first parity checking result; and a determining module, determining whether the TMCC signal in the ISDB-T signal is detected according to the first parity checking result.

7. The circuit according to claim 6, wherein the determining module determines whether the TMCC signal in the ISDB-T signal is detected by executing the following steps:

determining whether the parity check for the reference bits of the $(K+19)^{th}$ to the $(K+120)^{th}$ symbols has been done;

determining that the TMCC signal in the ISDB-T signal is detected when the parity check has been done; and updating the reference bits of the $(K+204)^{th}$ to the $(K+219)^{th}$ symbols of the ISDB-T signal as a second word-synchronous serial data of the ISDB-T signal when the parity check has not yet been done, determining whether one of the synchronizing signals of the ISDB-T signal is detected according to a comparison result generated by comparing the first word-synchronous serial data and the second word-synchronous serial data, and then determining whether the TMCC signal in the ISDB-T signal is detected according to the first parity checking result.

8. The circuit according to claim 7, wherein the determining module determines whether one of the synchronizing signals of the ISDB-T signal is detected according to the comparison result generated by comparing the first word-synchronous serial data and the second word-synchronous serial data, and then determines whether the TMCC signal in the ISDB-T signal is detected according to the first parity checking result by executing the following steps:

determining whether the reference bits of the second word-synchronous serial data are all equal to the reference bits of the first word-synchronous serial data;

determining one of the synchronizing signals of the ISDB-T signal is detected when the reference bits of the second word-synchronous serial data are not all equal to the reference bits of the first word-synchronous serial data, executing the parity check for the reference bits of the $(K+223)^{th}$ to the $(K+324)^{th}$ symbol by the reference bits of the $(K+325)^{th}$ to the $(K+406)^{th}$ symbol to generate a second parity checking result, and then determining whether the TMCC signal in the ISDB-T signal is detected according to the second parity checking result; and determining one of the synchronizing signals of the ISDB-T signal has not yet been detected when the reference bits of the second word-synchronous serial data are all equal to the reference bits of the first word-synchronous serial data, initializing the $(K+219)^{th}$ symbol by the first symbol, and then the comparison module sequentially comparing the reference bits of the symbols with the two synchronizing signals in the TMCC signal.

9. The circuit according to claim 7, wherein the determining module determines whether one of the synchronizing signals of the ISDB-T signal is detected according to the comparison result generated by comparing the first word-synchronous serial data and the second word-synchronous serial data, and then determines whether the TMCC signal in the ISDB-T signal is detected according to the first parity checking result by executing the following steps:

comparing each reference bit of the first word-synchronous serial data and each reference bit of the second word-synchronous serial data one by one to generate a statistical result representing for a number counted when the reference bit of the first word-synchronous serial data is equal to the reference bit of the second word-synchronous serial data;

determining whether the statistical result is equal to or larger than a threshold number;

determining one of the synchronizing signals of the ISDB-T signal is detected when the statistical result is less than the threshold number, executing the parity check for the reference bits of the $(K+223)^{th}$ to the $(K+324)^{th}$ symbols by the reference bits of the $(K+325)^{th}$ to the $(K+406)^{th}$ symbols to generate a second parity checking result, and then determining whether the TMCC signal in the ISDB-T signal is detected according to the second parity checking result; and determining one of the synchronizing signals of the ISDB-T signal has not yet been detected when the statistical result is equal to or larger than the threshold number, initializing the $(K+219)^{th}$ symbol by the first symbol, and then returning to the step of sequentially comparing the reference bits of the symbols with the two synchronizing signals in the TMCC signal according to claim 1.

10. The circuit according to claim 6, wherein the synchronizing signals are complementary signals.

* * * * *